US008773281B2

(12) United States Patent
Ghazarian

(10) Patent No.: US 8,773,281 B2
(45) Date of Patent: Jul. 8, 2014

(54) INTERSECTION VEHICLE COLLISION AVOIDANCE SYSTEM

(76) Inventor: Ohanes D. Ghazarian, Henderson, NV (US)

( * ) Notice: Subject to any disclaimer, the term of this patent is extended or adjusted under 35 U.S.C. 154(b) by 204 days.

(21) Appl. No.: 13/373,206

(22) Filed: Nov. 8, 2011

(65) Prior Publication Data

US 2012/0095646 A1 Apr. 19, 2012

Related U.S. Application Data

(63) Continuation-in-part of application No. 12/586,016, filed on Sep. 15, 2009, now Pat. No. 8,068,036.

(51) Int. Cl.
*G08G 1/16* (2006.01)
(52) U.S. Cl.
USPC .......................................... 340/903
(58) Field of Classification Search
USPC .......... 340/903, 907, 901, 919, 931, 933, 936
See application file for complete search history.

(56) References Cited

U.S. PATENT DOCUMENTS

| 5,635,920 | A | * | 6/1997 | Pogue et al. ................. 340/901 |
| 5,940,010 | A | * | 8/1999 | Sasaki et al. ................. 340/901 |
| 5,952,941 | A | * | 9/1999 | Mardirossian ................ 340/936 |
| 6,166,658 | A | * | 12/2000 | Testa ............................... 701/93 |
| 6,370,475 | B1 | * | 4/2002 | Breed et al. ................... 701/301 |
| 6,516,273 | B1 | * | 2/2003 | Pierowicz et al. ............ 701/301 |
| 6,617,981 | B2 | * | 9/2003 | Basinger ....................... 340/909 |
| 6,807,464 | B2 | * | 10/2004 | Yu et al. ........................... 701/1 |

* cited by examiner

*Primary Examiner* — Phung Nguyen

(57) ABSTRACT

A system which alerts vehicle drivers to avoid intersection vehicle collision, the system comprises of a plurality of vehicles containing a vehicle mount or portable collision avoidance device, equipped with a GPS receiver for providing vehicle location, vehicle travel direction, vehicle speed, vehicle distance from an intersection location to the vehicle collision avoidance device processor, and an RF transceiver for receiving plurality of intersection location traffic signal lights condition information from a broadcasting station, which includes at least one traffic light condition signal at acquisition time. The processor compares the received vehicle GPS location information, with vehicle travel direction, vehicle distance from the intersection, vehicle speed and received broadcasted signal light condition information, and accordingly generates a first warning alarm signal to warn the driver of not being in compliance with the traffic light condition, if the driver becomes none responsive, the collision avoidance device transmits a secondary warring alarm signal(s) to other vehicle drivers indicating the presence of an intersection vehicle collision condition.

7 Claims, 3 Drawing Sheets

INTERSECTION VEHICLE COLLISION AVOIDANCE SYSTEM

This application is continuation in part of US none provisional application Ser. No. 12/586,016 which is now U.S. Pat. No. 8,068,036 B2.

BACKGROUND OF INVENTION

Vehicles, such as passenger cars, trucks, buses, airplanes generally have the need to cross or pass intersections under the control of traffic signals or signs.

Since the earliest times, the driver of motor vehicles depend on such signals, and the decision to pass a motor vehicle an intersection was solely depended on traffic signals and vehicle driver, based on driver vision, alertness, awareness, judgment etc. This has not always proven to be successful, in the past and present vehicles involve in intersection accidents are among the highest compare to vehicle accidents reports on the roads and highways, due to driver confusion, impaired, inattention, or overly aggressive driver attitude, and speed.

There have been many systems proposed to address problems of ability to warn drivers of presence of emergency vehicle at an intersection, or ability of an emergency vehicle to control traffic light, or controlling traffic light by satellite. One such system is disclosed in;

U.S. Pat. No. 5,926,113 to Jones et al. Where at a traffic signal preemption system, including a vehicle mount GPS receiver, for transmitting its GPS measurements by radio to a computer interfaced receiver at the controlled intersection, to determine the optimum time to switch a traffic light controller, to permit safe passage of an emergency vehicle.

U.S. Pat. No. 6,133,854 to Yee et al. Teaches a local traffic controller interfaced with satellite subscriber unit, to provide centralized control of traffic signals. The communication path may be utilized for accessing information from traffic signal controller.

U.S. Pat. No. 6,326,903 to Gross et al. Discloses a system that allows operators of emergency vehicle to obtain graphic data regarding other emergency vehicle that may pose threats of collision. Automatic signal takes place between emergency vehicles within range of each other to transmit directional data regarding the direction of travel of each emergency vehicle.

U.S. Pat. No. 6,516,273 to Pierowicz et al. which illustrates a method and apparatus for determination potential violation of intersection traffic, by utilizing a vehicle mount GPS based Intersection warning device to Alert the driver, in an event vehicle driver is not responsive to said Intersection traffic control condition system.

U.S. Pat. No. 5,926,114 to Andrews, teaches an intersection warning system, where a vehicle mount radar unit detecting Intersection tags to warn a vehicle driver to the presence of Intersection.

U.S. Pat. No. 5,940,010 to Sasaki et al. describes a vehicle mount intersection warning system, using traffic lane marker magnet for warning the driver of the vehicle, based on results obtained by determination whether the detected running state of said vehicle is appropriate by estimating running state of said vehicle at the boundary position at said intersection. And control unit carrying out a braking control of said vehicle based on the results obtained by the vehicle determination unit.

U.S. Pat. No. 5,635,920 to Pogue et al. describes a remote traffic signal indicator, where transmitters of highly directional energy is installed at traffic lights, while receivers for this radiant energy are installed on each vehicle to warn the driver approaching a traffic signal.

U.S. Pat. No. 6,617,981 B2 to Basinger which illustrates a traffic control method for multiple intersections using street transponders for the detection the presence of vehicles to adjust traffic control lights timing.

U.S. Pat. No. 5,952,941 to Mardirossian which teaches a satellite traffic control and driver ID ticketing system, where a GPS based vehicle speed monitoring device is utilized to detect the speed limit on the road upon which the vehicle is traveling is exceeded. If and when the speed limit is exceeded, a transmitter on the vehicle transmits a signal to at least one satellite indicative of the violation U.S. Pat. No. 5,952,941 to Testa describes a speed limit control system involving road monitors and speed limit control in the vehicle which receives signals from road in traffic signs that can automatically lower and restrain vehicle speed.

As illustrated in prior art such as U.S. Pat. No. 6,516,273 to Pierowics et al, U.S. Pat. No. 5,940,010 to Sasaki et al. and U.S. Pat. No. 5,926,114 to Andrews, and other prior arts which teach methods, such in an event a vehicle driver becomes not responsive to intersection traffic control signal condition, the vehicle mount apparatus generates warning signals, for the driver to use vehicle brakes, to slowdown the vehicle to a full stop.

Such teachings found in prior arts cannot necessarily secure avoiding intersection vehicle collision, due to the fact if one presumes the driver whom is not responsive to intersection traffic signal conditions and ignores the warning signals produced by the vehicle mount apparatus and decides not to apply vehicle brake to stop the vehicle at an intersection, where traffic light condition does not permit the driver cross the intersection, and continues to accelerate the vehicle and passes the intersection crossing line, and collides with vehicle(s) crossing the intersection, or hit a pedestrian(s) crossing the intersection, thus causing property damage, bodily injury and possibly death.

Since the vehicle mount apparatus used in prior art teachings clearly indicate, if a vehicle driver is not in compliance to a traffic signal condition, the vehicle mount apparatus only warns the driver of the vehicle of which the apparatus is installed in, the methods used in prior arts does not describe of sounding vehicle horn, or flash vehicle headlights to warn pedestrian and other vehicle drivers. In particularly the prior art teaching vehicle collision avoidance devices do not contain an RF transmitter to transmit a secondary warning alarm signal to alert other vehicle drivers when the driver of a vehicle becomes none responsive to the first warning alarm signal, contrary to the present invention wherein each one of the vehicle collision avoidance device contains an RF transceiver which transmits RF warning Alarm signal(s) to other vehicle(s) located at the intersection equipped with a vehicle collision avoidance device having an RF transceiver circuitry, which upon receipt of the warning transmitted signal(s) generates warning signals to warn other vehicle driver(s) to the presence of intersection vehicle collision condition. Thus the present art teaching clearly illustrates an improvement in the art.

It would be obvious to a skilled artisan to recognize that the audio and/or visual alarm signal of Pierowies et al. can be used for warning pedestrians, and if one presume the use of such method and implements such teaching and connect the vehicle horn or vehicle headlights to Pierowies et al vehicle collision avoidance apparatus, and when a vehicle driver fail to respond to intersection signal condition, Pierowies et al. teachings warning alarm circuitry immediately will sound the vehicle horn or flash the vehicle headlights, at the same time generates driver warning alarm signals, thus giving no chance for the driver to response to the warning alarm condition before the vehicle makes unnecessary sounds and light flashes. Example, at first initiated driver warning alert signal, the same time vehicle horn will be generating unnecessary and undesirable sound(s) which may cause the driver to receive a city ordinance citation before vehicle driver had a chance to apply vehicle brake to slow down the vehicle. Since Pierowics et al. teaching does not utilize two separate condition timed warring alarm circuitry, teachings found in Piorowics et al cannot be applied or used as teachings found in the present invention, which contains an electronic circuitry to generate first warning alarm signals to warn the driver when the drivers becomes not in compliance with the traffic light condition, and contains second alarm circuitry to generate secondary warning alarm such as honk vehicle horn, flash vehicle headlights and utilizes an RF transceiver circuitry used for transmitting RF warning alarm signal, when driver of the vehicle becomes not responsive to the first warning alarm signals, used to warn other vehicle drivers and pedestrians located at the intersection, the other vehicle(s) located at the intersection is equipped with collision avoidance devices, which upon receipt of the transmitted RF signals generates warning alarm signals to warn other vehicle driver(s) to take necessary course of action to avoid vehicle collision.

In addition Pierowies et al. and Sasaki et al. teachings additionally describe, if and when a vehicle driver becomes none responsive to a vehicle mount apparatus generated warning signals to slow down the vehicle to stop, the vehicle mount apparatus automatically implies vehicle brake system. Since it is un-known for the vehicle brake control system to know how much brake pressure to apply, or when exactly to apply and when exactly to release the brake mechanism to avoid an intersection collision, thus the use of such automatic brake system may not be safely applied in the art.

For example, a driver pending on traffic condition upon receipt of warning signal may found it is not safe to make a sudden stop to avoid being rear end, it may apply a little pressure on brake pedal. Or the driver realizes using vehicle brake may not avoid collision with a vehicle located in front, and finds it safer to change lane rather then apply brake. Another example during lane change if automatic brake system is applied the braking may cause a next lane vehicle collide (rear end) with his or her vehicle, or if driver chooses rather then stopping the vehicle decide to make a right turn, and as the vehicle making right turn if vehicle's automatic brake system engages the vehicle may stop on a street corner, this condition may create the possibility of collision with other vehicles crossing the intersection. Further more, a vehicle driver pending on traffic condition may find safer to cross the intersection rather then stop in the middle of intersection the use of such automatic braking system found in prior art teachings, definitely creates the potential for intersection collision. Conclusively Automatic vehicle brake implementation system found in prior art teachings definitely found to be unsafe method to use in the art.

Although the findings in Jones et al., Yee et al., and Gross et al. and others are useful, but none of prior art teachings indicates where when a vehicle driver ignores received intersection collision condition warning alarm signals from vehicle mount apparatus to slow down to a stop, and if vehicle driver becomes not responsive to such alarm warning signals, the vehicle mount collision avoidance device automatically transmits audio/visual secondary warning signals for the pedestrians to take necessary action to avoid being hit by a vehicle, and provide warning to other vehicles located near the intersection to take necessary action to avoid an intersection vehicle accident, and none of prior art teaches provides a vehicle intersection collision avoidance device having an RF transmitter designed to transmit secondary warning alarm signals when a vehicle driver does not slow down the vehicle speed based on received intersection condition signal(s) wherein the intersection signal condition does not permit vehicles to cross the intersection, the present invention vehicle collision avoidance device transmitted secondary alarm RF signals are received by other vehicles located near the intersection equipped with collision avoidance devices, which upon receipt of the transmitted signals generates audio/visual or vibrating alarm signals for other vehicle driver(s) to take necessary measures to avoid collision with the vehicle whose driver is not responsive to the traffic signal condition.

The present art teaching clearly indicates the use of two warning circuitry, first alarm for the vehicle driver when driver is not in compliance with traffic light condition, and a secondary delayed alarm when the driver become none responsive to vehicle collision avoidance device generated warning alarm signals, which then activates the vehicles external horn and or flash vehicle headlight to warn pedestrians and other vehicle drivers located at that intersection, and transmit RF signals to warn other vehicle drivers located at the intersection. The teachings found in the present invention represent definite improvement to the art Accordingly, it is the primary objective of the present invention that provides a secure intersection vehicle collision avoidance system, which comprises; a plurality of vehicles containing a vehicle mount or portable vehicle collision avoidance device having; an RF transceiver designed for receiving plurality of intersection location traffic signal light condition information from a broadcasting station, a GPS receiver and a processor containing at least one map data base, and a first and second warning alarm generating circuitry, the GPS receiver map database containing location information of plurality of intersection having traffic signals the vehicle collision avoidance devise GPS map processor in response to received vehicle travel direction information towards a particular intersection location, and in response to received particular intersection traffic signal light condition broadcasted information, the vehicle collision avoidance device processor compares the received intersection signal light condition signal(s) information with the vehicle GPS location information, the vehicle distance from the intersection and the vehicle travel direction along with vehicle speed to determine if vehicle speed is in compliance with the intersection signal light condition, based on the vehicle speed information and given intersection traffic signal light location information, If the traffic signal light condition does not permit the vehicle(s) to cross the intersection and the driver becomes not in compliance with the traffic signal light condition, the vehicle collision avoidance device initiates warning alarm signals which is designed to warn the vehicle driver and other vehicle driver(s) and pedestrian(s) located at a particular intersection, therefor broadcasting plurality of intersection signal lights condition information from a broadcasting station eliminates the need to install traffic signal light condition transmitters on every single intersection traffic light, as found in the teaching of the prior art. It is a further objective of present invention that provides other vehicle drivers and pedestrian(s) to take measures to avoid being hit by a vehicle when a vehicle driver is not in compliances with intersection traffic signal condition.

The Electronic Intersection vehicle Collision Avoidance System of the present invention must be durable and long lasting nature and it should require little or no maintenance to be provided by the user throughout its operating lifetime. In order to enhance the market appeal of the present invention, its components should also be of relatively inexpensive construction to thereby afford it the broadest possible market. Finally, it is also an objective that all of the aforesaid advantage and objectives of the present invention be achieved without incurring any substantial relative disadvantage.

The present art provides an intersection vehicle collision avoidance system which is affordable, and easy to install, simply by utilizing a vehicle collision avoidance device having a transceiver capable of receiving plurality of traffic signal light condition information transmitted from a broadcast station using LAN, WAN, Internet, or satellites transmitters, the receiver being attached to such devices already existing in modern vehicles, as GPS navigation devices and satellite radios, onboard vehicle computers for internet access, which with little modification such devises becomes useful in the art. The vehicle intersection collision avoidance device receiver used to receive the broadcasted traffic signal light condition information may be incorporated into a hand held GPS navigation or a cellular phone device by some hardware and firmware modification.

SUMMARY OF INVENTION

Intersection vehicle collisions cause human life loss and property damage. Intersection Traffic lights commonly used to help guide proper traffic flow at intersections, an Intersection with good visibility helps lower the possibility of intersection vehicle collision, as alert drivers avoid most intersection accident by driving in compliance with traffic signals conditions and driving within speed limit.

However sometime drivers are distracted by deep thoughts, looking towards vehicle instrument panel, busy talking to passenger or in some cases drivers try to race the intersection traffic lights, thus causing intersection vehicle collision.

It is according to the present invention, designed to avoid such unnecessary accidents, by the use of Electronic Vehicle intersection Collision Avoidance System.

The system comprises of Vehicles mount or portable intersection collision avoidance devices having RF receiver preferably a transceiver, a vehicle speed compare-tore CPU, a vehicle location and travel direction GPS receiver circuitry, a first audible, visual and or vibrating alarm warning devise used to warn the driver when the driver is not in compliance with the traffic light condition, and a secondary audible, visual and RF transmitted warning alarm signals to warn pedestrians and other vehicle drivers located within the proximity of an intersection. And a broadcast station used to transmit uniquely coded signals containing information to plurality of location traffic signal light condition.

When a vehicle is moving towards a particular intersection signal light, at a set distance from the traffic signal light the vehicle collision avoidance device compares received vehicle travel direction, traffic signal light condition broadcasted signal information. The received information additionally may contain, the traffic light period, an elapsed time period from a time point changed to the corresponding signal to the acquisition time point of the traffic light information, and traffic light location information, and information about the acquisition time point of the traffic light information, and additional information.

If received traffic signal light condition does not permit the vehicle to pass the intersection, the vehicle collision avoidance device processor compares the vehicle GPS location with the intersection location distance from the vehicle and received vehicle speed information from the vehicle speed comparator CPU to determine the vehicle speed, if vehicle driver is not on course of slowing down to comply with signal light condition, the vehicle collision avoidance device accordingly produces a first audio/visual and vibrating warning alarm to warn the driver to slow down the vehicle, if the driver becomes non responsive to the first warning alarm signal, the vehicle collision avoidance device transmitter transmits a secondary RF alarm signals to other vehicles located at that intersection equipped with intersection collision avoidance device, wherein the other vehicle collision avoidance devices upon receipt of the transmitted warning alarm signal(s) generates audio/visual or vibrating alarm to alert other vehicle drivers the presence of a vehicle(s) at the intersection who's driver is not in compliance with intersection traffic light condition. In addition the vehicle collision avoidance device of the present invention honks the vehicle horn and flashes the vehicle headlight to warn the pedestrians located at the intersection to take necessary measures to avoid getting hit by the vehicle.

In a preferred embodiment of the present invention, the vehicle intersection collision avoidance device utilizing a GPS (DGPS) utilizing a map data base used to determine vehicle location, vehicle travel direction, vehicle distance from a particular intersection signal light location, and vehicle speed condition.

When a vehicle mount or portable collision avoidance device receives a particular intersection traffic signal condition broadcast RF signal from a broadcasting station which related to vehicle travel direction towards the intersection traffic light, containing information to the traffic light period, an elapsed time period from a time point changed to the corresponding signal to the acquisition time point of the traffic light, and traffic light location information, and information about the acquisition time point of the traffic light information. The vehicle collision avoidance device processor compares the received traffic signal light condition information with vehicle GPS location and vehicle movement direction GPS received signals along with vehicle speed and intersection location map data base, if the traffic signal light condition does not permit the vehicle(s) to cross the intersection and if the vehicle speed is in the course of slowing down to stop at the intersection, the vehicle collision avoidance device processor will not generate warning alarm signals to the driver. If vehicle speed is not in compliance compared to vehicle location at a distance from the intersection, the vehicle collision avoidance device generates an audiovisual or vibrating alarm signal to alert the driver to slow down to stop the vehicle at the intersection, if the driver becomes none responsive to the first warning alarm, the vehicle collision avoidance devise produces a secondary audio visual alarm to alert the pedestrians and transmits RF alarm signals to other vehicles located at the intersection or attempting to cross the intersection, the other vehicles collision avoidance device(s) upon receipt of the RF alarm signal generates audio/visual and or vibrating alarm signals to warn other vehicle drivers to the presence of intersection collision condition.

In another embodiment of present invention the broadcasting station RF transmitted plurality of intersection location traffic signal light condition signals, may then be encrypted by vehicle collision avoidance device processor and accordingly the processor compares the received traffic light condition information with collision avoidance device GPS map data base intersection location distance information with the vehicle location, vehicle travel direction and vehicle speed, and accordingly determines to produces the warning alarm signals.

It is another objective of the present invention wherein the vehicle collision avoidance device GPS map data base contains each of traffic intersection location information, wherein the vehicle GPS map data base processor compares the received vehicle location information with the map database intersection location and vehicle travel direction, if the intersection condition does not permit the vehicle to pass the intersection before a full stop, the vehicle collision avoidance device processor compares received vehicle speed received from the vehicle speed compare-tore CPU, and compares the vehicle GPS location with the intersection location distance from the vehicle, and if traffic light condition does not permit the vehicle(s) to cross the intersection, if vehicle driver is not on course to slow down the vehicle for a full stop at the intersection, the vehicle collision avoidance device accordingly produces a first audio/visual and vibrating warning alarm to warn the driver to slow down the vehicle, if the driver becomes not responsive to the first warning alarm signal, the vehicle collision avoidance device transmitter transmits a secondary RF alarm signals to other vehicles located at that intersection equipped with intersection collision avoidance device, wherein the other vehicle collision avoidance devices upon receipt of the transmitted warning alarm signal(s) generates audio/visual or vibrating alarm to alert other vehicle drivers the presence of a vehicle(s) at the intersection who's driver is not in compliance with intersection stop signal. In addition the vehicle collision avoidance device of the present invention honks the vehicle horn and flashes the vehicle headlight to warn the pedestrians located at the intersection to take necessary measures to avoid getting hit by the vehicle.

BRIEF DESCRIPTION OF THE DRAWING

This and other advantages of the present invention are best understood with reference to the drawings, in which.

DETAILED DESCRIPTION OF THE INVENTION

Figure 1:
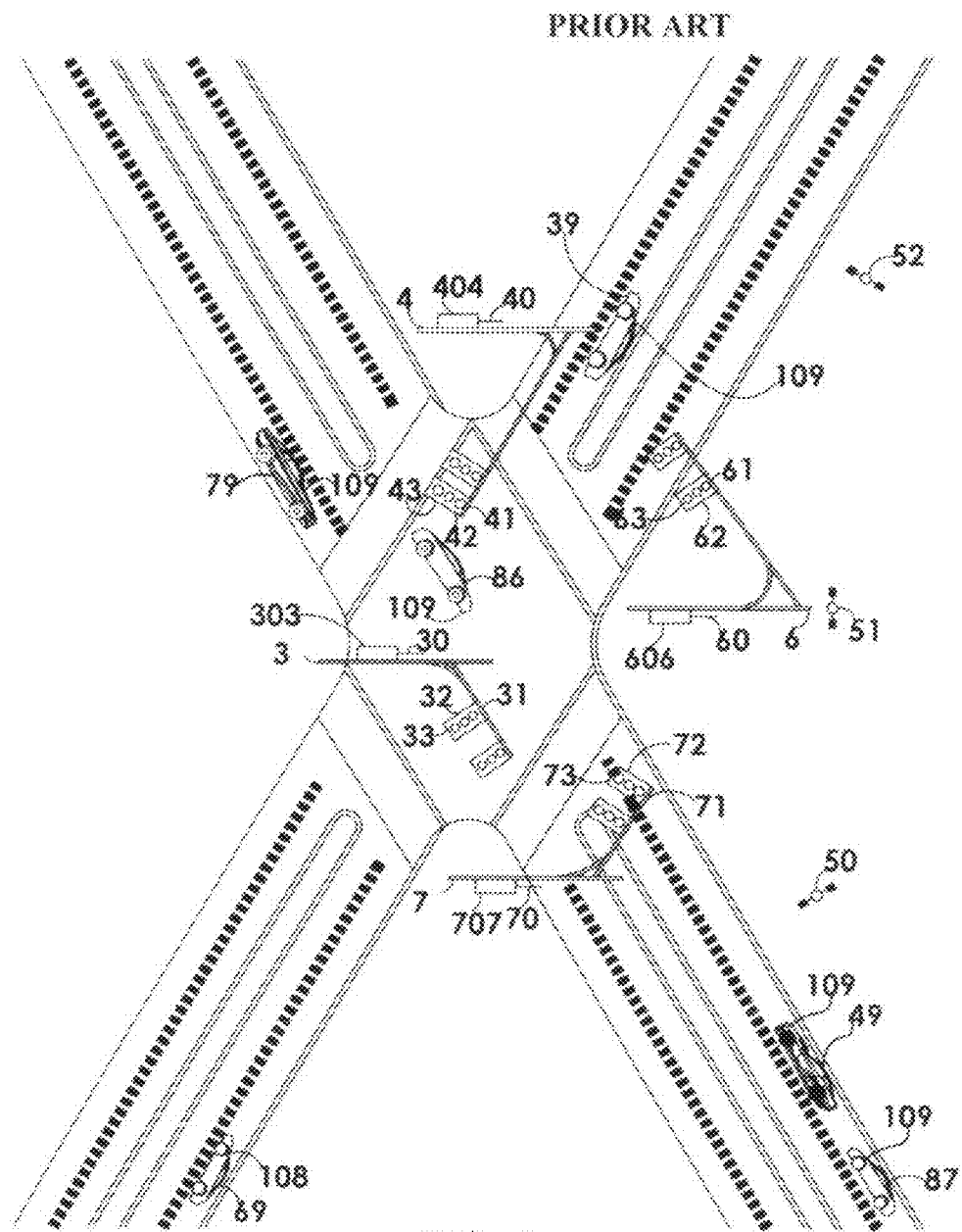
FIG. 1 is a drawing with view of an intersection having four traffic lights each one of said traffic lights contains signal light. And as illustrated in the drawing, plurality of vehicles equipped with electronic collision avoidance device. And In addition showing GPS system integration.

The preferred embodiment of the electronic intersection vehicle collision avoidance system of the present invention is illustrated in as deployed in the exemplary situation of an intersection in FIG. 1. Four traffic light posts, north 3, south 6, east 4, and west 7, are installed on an intersection, each one of said post 3, 6, 4, and 7, are equipped with a traffic light control box 303, 606, 404, and 707, and each one of the traffic light control box is controlling each of the traffic signal lights 31,32, 33, 41,42, 43, 61, 62, 63, 71, 72, and 73 condition. Or each one of the control box 303, 606, 404, and 707, receiving command FIG. 3 from a broadcast station 209 by wired or wireless RF signals through the control box transceiver 30, 60, 40, and 70, and each one of said traffic signal lights 31,32, 33, 41,42, 43, 61, 62, 63, 71, 72, and 73. The traffic control box is designed to control and synchronize time duration to each one of traffic light condition, and designed to send each one of the traffic signal light condition information to a broadcasting station 209 server. The broadcast station 209 (Not shown in FIGS. 1 and 2). server may from it's data base transmit uniquely coded signals to plurality of intersection traffic signal control box 303, 606, 404, and 707 for controlling each of the plurality of location traffic signal light condition 31,32, 33, 41,42, 43, 61, 62, 63, 71, 72, and 73.

Figure 3:
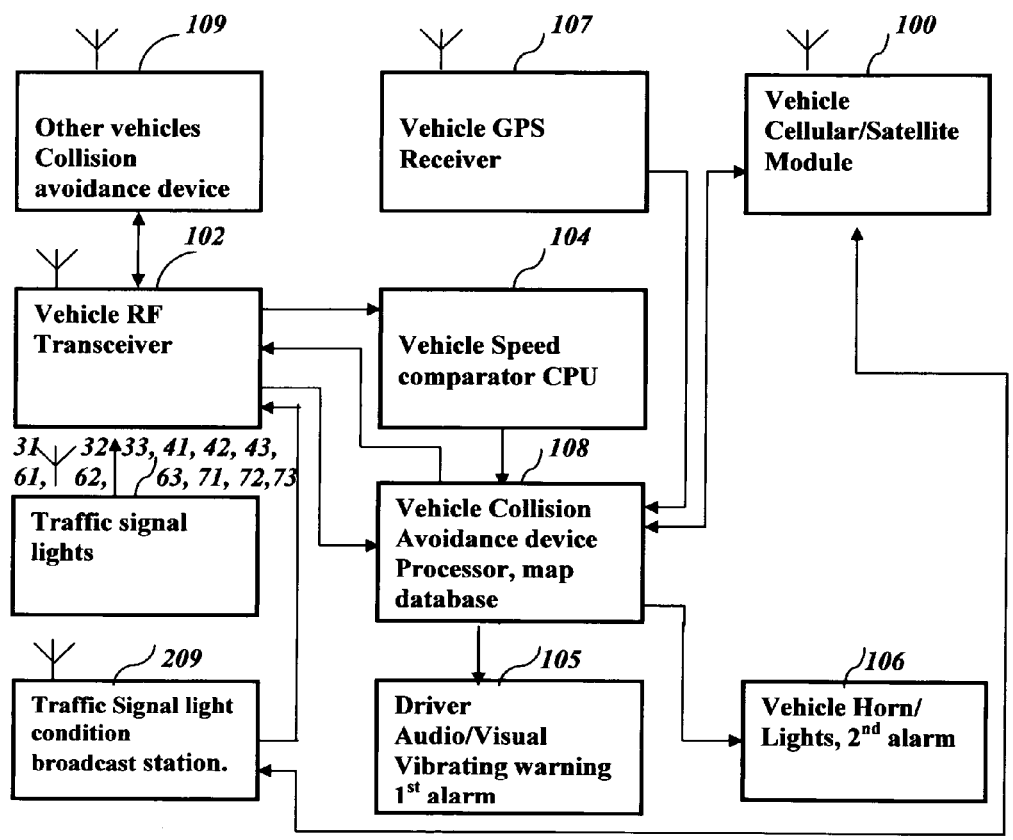
FIG. 3 Is a Drawing of functional block diagram of the Electronic Vehicle Intersection Collision Avoidance System.

A plurality of vehicles 39, 49, 69, 79, 86, 87 containing vehicle collision avoidance device 108, 109 FIG. 3 containing a vehicle speed compare-tore CPU 104, and an RF transceiver 102, or a cellular/Satellite module 100, and a vehicle location and travel direction detection GPS circuitry 107 which may be used for detecting vehicles speed in particularly if the collision avoidance device is portable, and a first 105 and a second 106 warning alarm circuitry. The vehicles 39, 49, 69, 79, 86, 87 collision avoidance device RF transceiver 102 is design to receive traffic signal light condition from a broadcasting station 209, plurality of broadcast coded signals contains information to plurality of location signal light condition information, each one of the particular location traffic signal condition which refers to traffic signal lights 41,42, 43, 61, 62, 63, 71, 72, and 73, includes information for a traffic light ID, traffic light location information, traffic light period, an elapsed time period from a time point changed to the corresponding signal to the acquisition time point of the traffic light, and information about the acquisition time point of the traffic light information. If a particular direction traffic signal condition broadcasted received information is relates to signal light 61 (amber), or 62 (red) does not permit a particular direction traveling vehicle 69 to pass the intersection, Or received signal light information of a traffic light period, an elapsed time period from a time point changed to the corresponding signal to the acquisition time point of the traffic light, and information about the acquisition time point of the traffic light information, which is associated with vehicle travel direction traffic signal light post 6, the vehicle collision avoidance devise processor 108 compares the received traffic signal condition 209 information with the received vehicle speed comparator 104 or received vehicle GPS circuitry 107 coordinate vehicle speed information, if the vehicle 69 speed is not in compliances with the traffic signal condition, 209 the vehicle collision avoidance device 108 initiates said first internal warning alarm signal(s) 105 to warn the driver to slow down the vehicle to a stop, if the driver becomes non responsive to the first alarm signal(s) 105, at a predetermined time the vehicle collision avoidance device 108 initiates secondary external alarm signal 102, 106 by transmitting RF warning signal(s) 102 to other vehicle(s) 39, 49, 79, 87 and 96, located within or within the boundaries of the intersection, the other vehicle(s) 39, 49, 79, 87 and 96 collision avoidance devices 109 upon receipt of transmitted signal(s) 102, generate a warning alarm signal(s) 105 to alert the driver(s) to take necessary measures to avoid intersection collision with the vehicle 69 whose driver is not in compliance with the intersection signal condition 61, or 62.

When north bound and south bound traffic light control box 303, 606 turns said traffic signal lights to green 33, 63 permitting vehicle 69 traveling southbound and vehicle 39 traveling north bound traffic direction to pass the intersection, the vehicles equipped with collision avoidance device 108,109 approaching the intersection, the vehicle's 39, and 69 on board collision avoidance devices 108, 109 receiver receives the broadcast signal(s), which includes information to the associated traffic light ID, traffic light location information, traffic light condition, traffic light period, an elapsed time period from a time point changed to the corresponding signal to the acquisition time point of the traffic light, and information about the acquisition time point of the traffic light information, with the vehicle travel direction and vehicle speed, and compares the received signals with vehicle location and with the vehicle speed. If a particular direction traffic signal condition (Is green light) and the elapsed time permits the vehicles 39 and 69 to pass the intersection the vehicles onboard collision avoidance device will not initiate warring signals to the operator's of vehicles 39, and 69, and the vehicles 39, and 69 safely can cross the intersection. If a particular direction traffic signal condition (Is green light) and not enough time remained in the elapsed time the vehicles 39 and 69 to pass the intersection, the vehicles onboard collision avoidance device will initiate warring signals to the operator's of vehicles 39, and 69, and the vehicles 39, and 69 safely can cross the intersection.

As illustrated in FIG. 1 where as vehicle(s) 39, 69,79,87, 96, equipped with intersection collision avoidance devices 108,109 having vehicle speed compare-tore CPU to detect vehicle speed, and a GPS receiver is used to detect vehicle location and vehicle travel direction movement which may be used to detect vehicle speed. When the vehicle(s) 49, 79, 87, 96 collision avoidance devise processor 108 receives the vehicle(s) travel direction intersection signal light condition transmitted signal from a broadcasting station 209 which relates to the condition of 42,72, (amber) or 41, 71 (Red), the vehicle(s) 49,79,87, 96 collision avoidance devises compares the uniquely coded received traffic signal light 42,72,41,71 condition information, with the received vehicle(s) 49,79,87, 96 GPS location information along with vehicle(s) speed to determine vehicle(s) 49,79,86,87 driver(s) are slowing down to stop the vehicle(s) 49,79,86,87 at the intersection.

In a preferred embodiment of the present invention, FIG. 1 the vehicles 39,49,69,79, 96 are equipped with GPS or DGPS receivers 107 having a map database, which is incorporated with the vehicle(s) 39,49,69,79,96 collision avoidance device 108,109. When vehicles 49,79 equipped with GPS based collision avoidance device receives uniquely coded RF signal from a broadcasting station 209 containing information to a particular intersection traffic light condition as being red signal light 41,71, the vehicle(s) 49, 79 collision avoidance processor 108 compares the particular intersection traffic light uniquely coded received signal which may be transmitted through satellite(s) 50,51,52 or a LAN, WAN, Internet, cellular, satellite based transmitter. If the received coded signal(s) and the vehicle 49,79 collision device GPS map database 107 travel direction detected signal is associated, the vehicle(s) 49,79 collision avoidance processor 108 compares the vehicle(s) 49,79 travel direction, and the vehicle location with the intersection location information along with the vehicle 49, 79 speed base on received GPS satellite 50,51, 52 signals, if any one of the vehicle 49,79 driver becomes not in compliances to slow down the vehicle to the intersection light condition to stop the vehicle at the intersection, the particular vehicle 49 or 79 collision avoidance device will generate audio-visual or vibrating alarm 105 to warn the driver to slow down, if the driver becomes not responsive to the warning alarm signal(s) 105, the vehicle collision avoidance device processor 108 transmits a secondary alarm condition signals 106 by honking vehicle horn, flash vehicle headlight to war pedestrians and other vehicle 39,69, 96 drivers located at the intersection, and transmit RF signals through the vehicle collision avoidance device RF transmitter 102 which is received by other vehicles 39,69, 96 located at the intersection equipped with collision avoidance devices 109 which then warns other vehicle drivers to the presence of an intersection collision.

Figure 2:
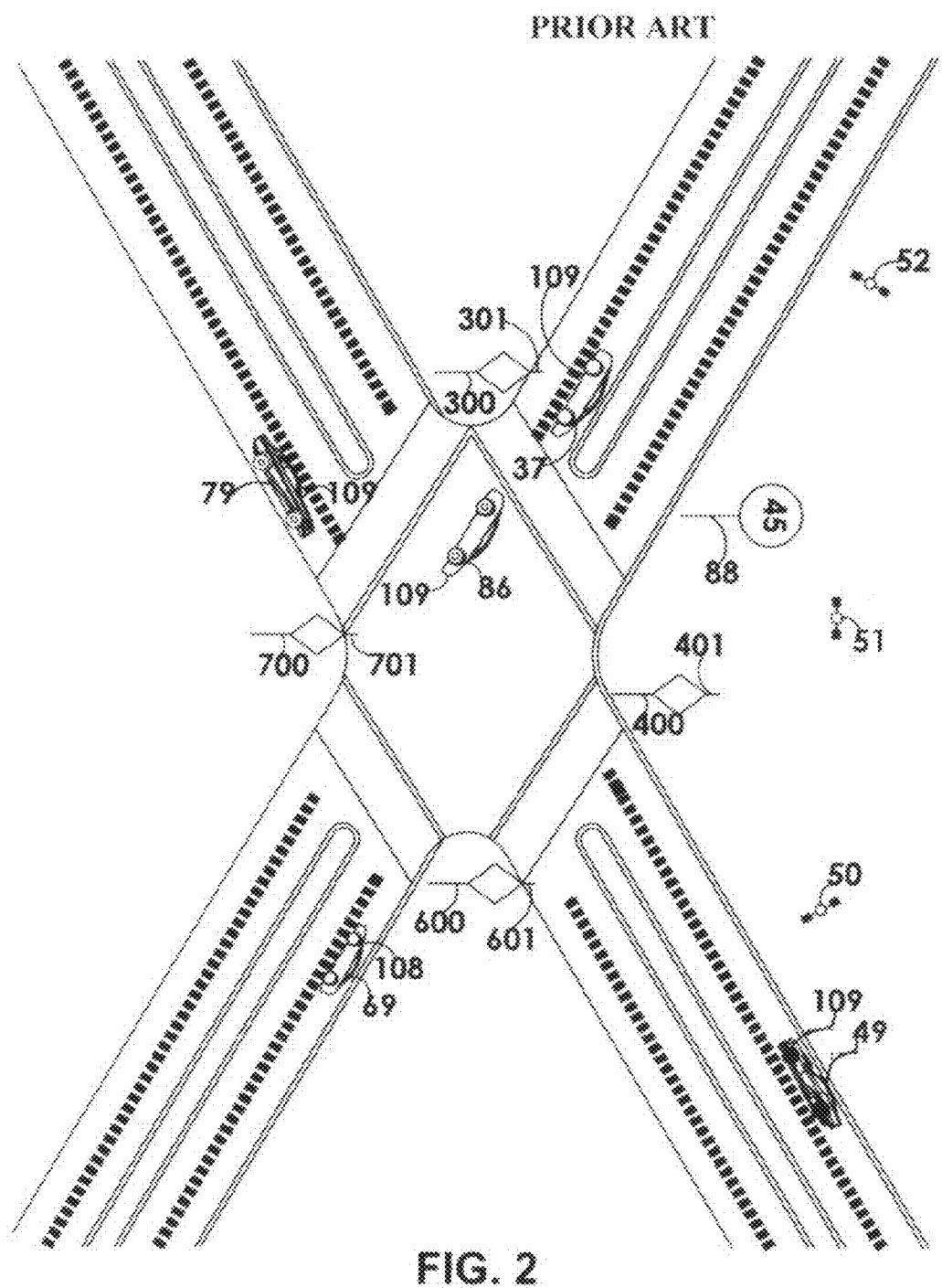
FIG. 2 is a drawing with view of an intersection having four traffic stop signs. As illustrated in the drawing, plurality of vehicles equipped with Electronic vehicle collision avoidance device. And in addition showing GPS system interrogation.

In a further embodiment of the present invention, wherein FIG. 2 plurality of street or highway intersection posted stop sings 300, 400,600,700 location information is downloaded in each one of vehicles 37,49,69,79 GPS based collision avoidance device 108, 109 map database 107,108, when vehicle(s) 37,49,69,79 moving based on posted speed sign 88 arrive at a particular intersection, each one of the vehicle(s) 37,49,69,79 GPS based collision avoidance device 107,108 processor compares each vehicle location with GPS map geographic location to each one of the stop sign 300, 400,600, 700 location and determines vehicle speed based on received GPS signals 50,51, 52, if vehicle(s) 37,49,69,79 driver(s) slowing down to stop the vehicle(s) the vehicle(s) collision avoidance device 108 will not generate warning alarm signals 105. If a particular vehicle 69 driver becomes not in compliance to slow down the vehicle to stop at the intersection stop sign, the particular vehicle 69 collision avoidance device 108 initiates the first internal warning alarm signal(s) 105 to warn the driver to slow down the vehicle to a stop, if the driver becomes non responsive to the first alarm signal(s) 105, at a predetermined time the vehicle collision avoidance device 108 initiates secondary external alarm signal 102, 106 by transmitting RF warning signal(s) 102 to other vehicle(s) 37,49,69,79, located within or within the boundaries of the intersection, the other vehicle(s) 37,49,79 and the collision avoidance devices 109 upon receipt of transmitted signal(s) 102, generate a warning alarm signal(s) 105 to alert other driver(s) to take necessary measures to avoid intersection collision with any one of vehicle(s) 37,49,79 whose driver 69 is not in compliance with the intersection signal condition.

The intersection collision avoidance device GPS receiver map data base processor may determine the presence of an intersection having stop sign, by receiving RF signals from intersection sign 300,400,600, 700 mount RF transmitters 301,401,601,701.

The invention claimed is:

1. A system for avoiding intersection vehicle collision, said system comprises of; a vehicle mount or portable collision avoidance device, containing a vehicle speed compare-tore CPU or speed reader, and a GPS vehicle travel direction and location detection circuitry, an RF transceiver, for receiving plurality of location traffic signal light condition information from a broadcasting station, at least one traffic light condition signal information at acquisition time, includes, a traffic light period an elapsed time period from a time point changed to the corresponding signal to the acquisition time point of the traffic light information, traffic light location information, information about the acquisition time point of the traffic light information, and designed to communicate with RF warning alarm signal(s) with other vehicle(s), equipped with a collision avoidance device, and a first and a second warning alarm circuitry, said traffic light broadcasting station transmitting signals containing information to each one of said plurality location traffic signal light condition, if a particular traffic signal condition information does not permit particular direction traveling vehicle(s) to pass the intersection, at a predetermine distance from said intersection, said vehicle(s) collision avoidance device receiver receives said traffic signal condition information associated with said vehicle travel direction, said vehicle collision avoidance device processor compares said received traffic signal condition signal information with said vehicle GPS travel direction, GPS location distance from said intersection signal light location, and compares with said vehicle speed, if said vehicle speed is not in compliances with said traffic signal condition, said vehicle collision avoidance device initiates said first internal warning alarm signal(s) to warn the driver to slow down the vehicle to stop at said intersection, if the driver becomes non responsive to said first warning alarm signal(s), at a predetermined time said vehicle collision avoidance device initiates said secondary external alarm signal by transmitting RF warning signal(s) to said other vehicle(s) located within or within the boundaries of said intersection, said other vehicle(s) collision avoidance device upon receipt of said transmitted signal(s) generates a warning alarm signal(s) to alert the driver to take necessary measures to avoid intersection collision with said vehicle.

2. The system according to claim 1 wherein said vehicle collision avoidance device generated first internal warning alarm is audible, verbal, visual, or vibrating alarm signals to warn the driver, and said secondary external alarm signal additionally comprises of a honking horn and or vehicle light(s) flash, used to generate audio and or visual alarm signals to warn pedestrians and or other vehicle driver(s) to the presence of an intersection collision condition.

3. The system according to claim 1 wherein said vehicle Collision avoidance device is equipped with a GPS receiver for providing vehicle location, vehicle travel direction, vehicle speed, vehicle distance from said intersection location information to said vehicle collision avoidance device processor, said processor compares said vehicle GPS location, with said vehicle travel direction, said vehicle distance from said intersection, said vehicle speed and with said received broadcasted signal light condition information and accordingly determines said vehicle driver is or is not in compliance with said traffic signal condition, and generates said first and secondary warning alarm signals.

4. A system for avoiding intersection vehicle collision system, wherein said system comprises; a plurality of vehicles containing a vehicle mount or portable vehicle collision avoidance device having; an RF transceiver designed for receiving plurality of intersection traffic signal light condition information from a broadcasting station, which includes, at least one traffic light condition signal information at acquisition time, a traffic light period an elapsed time period from a time point changed to the corresponding signal to the acquisition time point of the traffic light information, traffic light location information, information about the acquisition time point of the traffic light information, and said vehicle collision device is designed to communicate with RF warning alarm signal(s) with other vehicle(s) located at the intersection, equipped with a collision avoidance device, a GPS receiver a processor containing at least one map data base and a first and second warning alarm generating circuitry, said GPS receiver map database containing location information of plurality of intersection having traffic signals, said vehicle collision avoidance devise GPS map processor in response to detecting said vehicle movement direction towards a particular interaction location, and in response to received said particular intersection traffic signal light condition broadcast signal information, said vehicle collision avoidance device processor compares said particular intersection signal light condition received signal(s) information with said vehicle GPS location information, said vehicle distance from said intersection and said vehicle movement direction, with said vehicle speed, to determines if vehicle speed is in compliance based on said vehicle location received GPS information and given intersection traffic signal light location information, If said traffic signal light condition signal(s) does not permit vehicle(s) to cross the intersection and the driver becomes not in compliance with said traffic signal light condition, said vehicle collision avoidance device initiates said first warning alarm signal(s) to warn the driver to slow down to stop the vehicle at the intersection, if the driver becomes none responsive to said first warning alarm, at a predetermined time said vehicle collision avoidance device generates a secondary RF warning alarm and establishes communication link with other vehicle(s) located within the proximity of the intersection equipped with a collision avoidance device, which upon receipt of said secondary transmitted signal, generates a warning alarm signal(s) to warn the other vehicle driver(s) to take necessary action to avoid intersection vehicle collision.

5. The system defined in claim 1 wherein said traffic signal light condition signals Is transmitted from a broadcasting station utilizing LAN, WAN, Internet, Satellite, cellular or other wireless means, and said broadcast signals are received by said vehicle collision avoidance device receiver, or transceiver, which contains intersection(s) traffic signal light location information in it's data base, said vehicle collision avoidance processor compares said received traffic signal light condition signal(s) with said vehicle GPS location, with vehicle speed and with said particular intersection location distance from the vehicle, and accordingly generate said first and second warning alarm signals.

6. The system defined in claim 4 wherein said plurality of intersection traffic signal light condition information is transmitted from a broadcasting station through LAN, WAN, Internet, Satellite, cellular or other wireless means, and said broadcast signals are received by said vehicle collision avoidance device receiver, which contains intersection(s) traffic signal light location information said vehicle collision avoidance processor compares said received traffic signal light condition signal(s) with said vehicle GPS location, with vehicle speed and with said particular intersection location distance from the vehicle, and accordingly generate said first and second warning alarm signals.

7. The system according to claim 4 wherein said vehicle collision avoidance device generated first internal warning alarm by audible, verbal, visual, or vibrating alarm signals, and said secondary warning alarm signal additionally comprises of a honking horn and or vehicle light(s), used to generate audio and or visual alarm signals to warn pedestrians and or other vehicle driver(s) to the presence of an intersection collision condition.

* * * * *